(12) United States Patent
Cragun et al.

(10) Patent No.: US 8,112,715 B2
(45) Date of Patent: Feb. 7, 2012

(54) CONTENT MANAGEMENT SYSTEM THAT RENDERS A DOCUMENT TO A USER BASED ON A USAGE PROFILE THAT INDICATES PREVIOUS ACTIVITY IN ACCESSING THE DOCUMENT

(75) Inventors: Brian John Cragun, Rochester, MN (US); John Edward Petri, Lewiston, MN (US)

(73) Assignee: International Business Machines Corporation, Armonk, NY (US)

( * ) Notice: Subject to any disclaimer, the term of this patent is extended or adjusted under 35 U.S.C. 154(b) by 796 days.

(21) Appl. No.: 11/831,480

(22) Filed: Jul. 31, 2007

(65) Prior Publication Data
US 2009/0037400 A1 Feb. 5, 2009

(51) Int. Cl.
*G06F 3/00* (2006.01)
(52) U.S. Cl. ......... 715/745; 715/229; 715/744; 707/757
(58) Field of Classification Search .................. 715/744, 715/745, 765, 229; 707/757
See application file for complete search history.

(56) References Cited

U.S. PATENT DOCUMENTS

| | | | | | |
|---|---|---|---|---|---|
| 5,313,227 | A | * | 5/1994 | Aoki et al. | 345/626 |
| 5,369,739 | A | * | 11/1994 | Akeley | 345/626 |
| 6,732,331 | B1 | * | 5/2004 | Alexander | 715/234 |
| 6,847,969 | B1 | * | 1/2005 | Mathai et al. | 1/1 |
| 6,959,319 | B1 | * | 10/2005 | Huang et al. | 709/203 |
| 7,085,755 | B2 | * | 8/2006 | Bluhm et al. | 1/1 |
| 7,203,909 | B1 | * | 4/2007 | Horvitz et al. | 715/765 |
| 7,634,463 | B1 | * | 12/2009 | Katragadda et al. | 1/1 |
| 7,714,878 | B2 | * | 5/2010 | Gabay et al. | 345/626 |
| 2002/0019817 | A1 | * | 2/2002 | Matsui et al. | 707/1 |
| 2004/0215718 | A1 | * | 10/2004 | Kazmi et al. | 709/203 |
| 2004/0249650 | A1 | * | 12/2004 | Freedman et al. | 705/1 |
| 2005/0033657 | A1 | * | 2/2005 | Herrington et al. | 705/26 |
| 2006/0075019 | A1 | * | 4/2006 | Donovan et al. | 709/203 |
| 2007/0100829 | A1 | * | 5/2007 | Allen et al. | 707/9 |

OTHER PUBLICATIONS

XMetal Author for Documentum, pp. 1-3.
"XML Application Guide", Version 5.3 Mar. 2005, p. 82.

* cited by examiner

*Primary Examiner* — Chat Do
*Assistant Examiner* — Phenuel Salomon
(74) *Attorney, Agent, or Firm* — Martin & Associates LLC; Derek P. Martin

(57) ABSTRACT

A content management system (CMS) monitors a user's activity for a document, generates corresponding usage data for the user, and binds the usage data to corresponding sections of the document. A relevance policy may be defined for a user and/or for a user's role. The CMS may then render the document to the user based on the usage data and the relevance policy. The rendered document may include displayed sections, hidden sections, and accentuated sections. The result is a document rendered to a user in a way that hides sections that are not of interest, displays sections of interest, and accentuates sections of high interest, all based on usage data that indicates how the document was accessed in the past.

19 Claims, 9 Drawing Sheets

```
obj_id    2349202
```
```xml
<DrugLabel>
<Name>Sneeze Free</Name>                                           — 610
<Description>This drug cures the common cold.</Description>        — 620
<ChemicalDetails>                                                  — 630
<EmpiricalFormula>XYZ-Formula</EmpiricalFormula>                   — 640
<ActiveIngredients>                                                — 650
ABC, DEF, GHI, JKL, XYZ
</ActiveIngredients>
<InactiveIngredients>                                              — 660
MNO, PQR, STU, VWX
</InactiveIngredients>
</ChemicalDetails>
<xi:include href="score://obj_id:2349283"/>                        — 670
</DrugLabel>
```

FIG. 6

```
obj_id    2349283
```
`<Copyright>Copyright 2007, GreatCo Drug Company</Copyright>`

FIG. 7

| Element Path | Edit Frequency (last edit time) | View Frequency (screen time) | View Frequency (cursor activity/ annotations) |
|---|---|---|---|
| /DrugLabel/Name | NULL | 5% | 0 |
| /DrugLabel/Description | NULL | 8% | 1 |
| /DrugLabel/ChemicalDetails/ EmpericalFormula | NULL | 5% | 0 |
| /DrugLabel/ChemicalDetails/ ActiveIngredients | March 3, 2007 | 80% | 10 |
| /DrugLabel/ChemicalDetails/ InactiveIngredients | NULL | 12% | 3 |

FIG. 8

```
<DrugLabel>
<Name><?cms relevanceData="hide"?>Sneeze Free</Name>                          —1110
<Description><?cms relevanceData="hide"?>This drug cures the                  —1120
common cold.</Description>
<ChemicalDetails>
<EmpiricalFormula><?cms relevanceData="hide"?>XYZ-Formula                     —1130
</EmpiricalFormula>
<ActiveIngredients><?cms relevanceData="accentuate"?>ABC, DEF,                —1140
GHI, JKL, XYZ</ActiveIngredients>
<InactiveIngredients><?cms relevanceData="neutral"?>MNO, PQR,                 —1150
STU, VWX</InactiveIngredients>
</ChemicalDetails>
<Copyright><?cms relevanceData="hide"?>Copyright 2007, GreatCo                —1160
Drug Company</Copyright>
</DrugLabel>
```

FIG. 11

| | |
|---|---|
| ... (data is hidden - click the + icon to expand) ... + | —1210 |
| ... (data is hidden - click the + icon to expand) ... + | —1220 |
| Chemical Details: | |
| ... (data is hidden - click the + icon to expand) ... + | —1230 |
| Active Ingredients for this drug are: | —1240 |
| ABC, DEF, GHI, JKL, XYZ. | |
| Inactive Ingredients for this drug are: | —1250 |
| MNO, PQR, STU, VWX. | |
| ... (data is hidden - click the + icon to expand) ... + | —1260 |

| obj_id | 2349245 |

```
<DrugLabel>
<Name>Cough Free</Name>
<Description>This drug gets rid of that nagging cough.</Description>
<ChemicalDetails>
<EmpiricalFormula>ABC-Formula</EmpiricalFormula>
<ActiveIngredients>
NOP,QRS,TUV
</ActiveIngredients>
<InactiveIngredients>
BCD,EFG,HIJ
</InactiveIngredients>
</ChemicalDetails>
<xi:include href="score://obj_id:2349283"/>          — 1310
</DrugLabel>
```

Drug Name: Cough Free
Description: This drug gets rid of that nagging cough.
ChemicalDetails:
EmpiricalForumla: *Formula goes here...*
ActiveIngredients: NOP, QRS, TUV
InactiveIngredients: BCD, EFG, HIJ
... (data is hidden - click the + icon to expand) ... +

FIG. 14

| Element Path | Accentuated Criteria | Hidden Criteria |
|---|---|---|
| /Copyright | NULL | NULL |

FIG. 15

```
... (data is hidden - click the + icon to expand) ... +
... (data is hidden - click the + icon to expand) ... +
Chemical Details:
... (data is hidden - click the + icon to expand) ... +
Active Ingredients for this drug are:
ABC, DEF, GHI, JKL, XYZ.
Inactive Ingredients for this drug are:
MNO, PQR, STU, VWX.
Copyright 2007, GreatCo Drug Company
```

FIG. 16

CONTENT MANAGEMENT SYSTEM THAT RENDERS A DOCUMENT TO A USER BASED ON A USAGE PROFILE THAT INDICATES PREVIOUS ACTIVITY IN ACCESSING THE DOCUMENT

BACKGROUND

1. Technical Field

This disclosure generally relates to content management systems, and more specifically relates to the rendering of documents to a user in a content management system.

2. Background Art

A content management system (CMS) allows many users to efficiently share electronic content such as text, audio files, video files, pictures, graphics, etc. Content management systems typically control access to content in a repository. A user may generate content, and when the content is checked into the repository, the content may be subsequently processed by the CMS according to predefined rules. A user may also check out content from the repository, or link to content in the repository while generating content.

A content management system may be accessed by a number of different users in a number of different roles. For example, a content management system might store documents defined by a drug labeling grammar for drugs developed by a pharmaceutical company. The drug labeling grammar could be divided into multiple sections, including: basic drug information that may include the drug's name, description, dosage, etc; the drug's empirical formula; the drug's active ingredients; the drug's inactive ingredients; adverse reactions; and other suitable information, such as a copyright notice. A non-technical author using this CMS to generate a certain drug label may only be interested in the basic drug information section, and may have no need to view the other sections of the document. On the other hand, a scientist that is working exclusively on the adverse effects of the drug might not care to see any of the basic drug information. A supervisor in the CMS may need to see certain sections at times and may need to see the entire document at other times. In the prior art, a document is typically rendered to all users the same or may be rendered differently based on user role or other criteria; however, a document's prior usage is not taken into consideration when the document is rendered. Without a way to detect a user's activity for a document and render the document according to the user's previous activity, content management systems will continue to render a document in the same statically defined ways, regardless of a user's individual need to access different sections of the document based on context and usage trends.

BRIEF SUMMARY

A content management system (CMS) monitors a user's activity for a document, generates corresponding usage data for the user, and binds the usage data to corresponding sections of the document. A relevance policy may be defined for a user and/or for a user's role. The CMS may then render the document to the user based on the usage data and the relevance policy. The rendered document may include displayed sections, hidden sections, and accentuated sections. The result is a document rendered to a user in a way that hides sections that are not of interest, displays sections of interest, and accentuates sections of high interest, all based on usage data that indicates how the document was accessed in the past.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 6 shows a sample XML document for a drug label;

FIG. 7 shows an object that was linked to in the XML document in FIG. 6;

FIG. 8 shows sample user usage data for a specific user for the document shown in FIG. 6;

FIG. 11 shows the sample XML document in FIG. 6 after inserting relevance markers according to the sample user usage data in FIGS. 8 and 9 and according to the sample relevance policy in FIG. 10;

FIG. 12 is a display of the document in FIG. 11 to a specific user in an XML editor showing hidden sections, an accentuated section, and a displayed section;

FIG. 13 is a second sample XML document that also references the object in FIG. 7;

FIG. 14 is a display of the document in FIG. 11 to the user in an XML editor showing displayed sections and a hidden section;

FIG. 15 shows a sample override policy that requires display of the copyright notice to all users; and FIG. 16 is a display of the document in FIG. 11 to the user in an XML editor based on the override policy shown in FIG. 15.

DETAILED DESCRIPTION

Many known content management systems use extensible markup language (XML) due to its flexibility and power in managing diverse and different types of content. One known content management system that uses XML is Solution for Compliance in a Regulated Environment (SCORE) developed by IBM Corporation. XML is growing in popularity, and is quickly becoming the preferred format for authoring and publishing. While the disclosure herein discusses XML documents as one possible example of content that may be managed by a content management system, the disclosure and claims herein expressly extend to content management systems that do not use XML.

Figure 1:
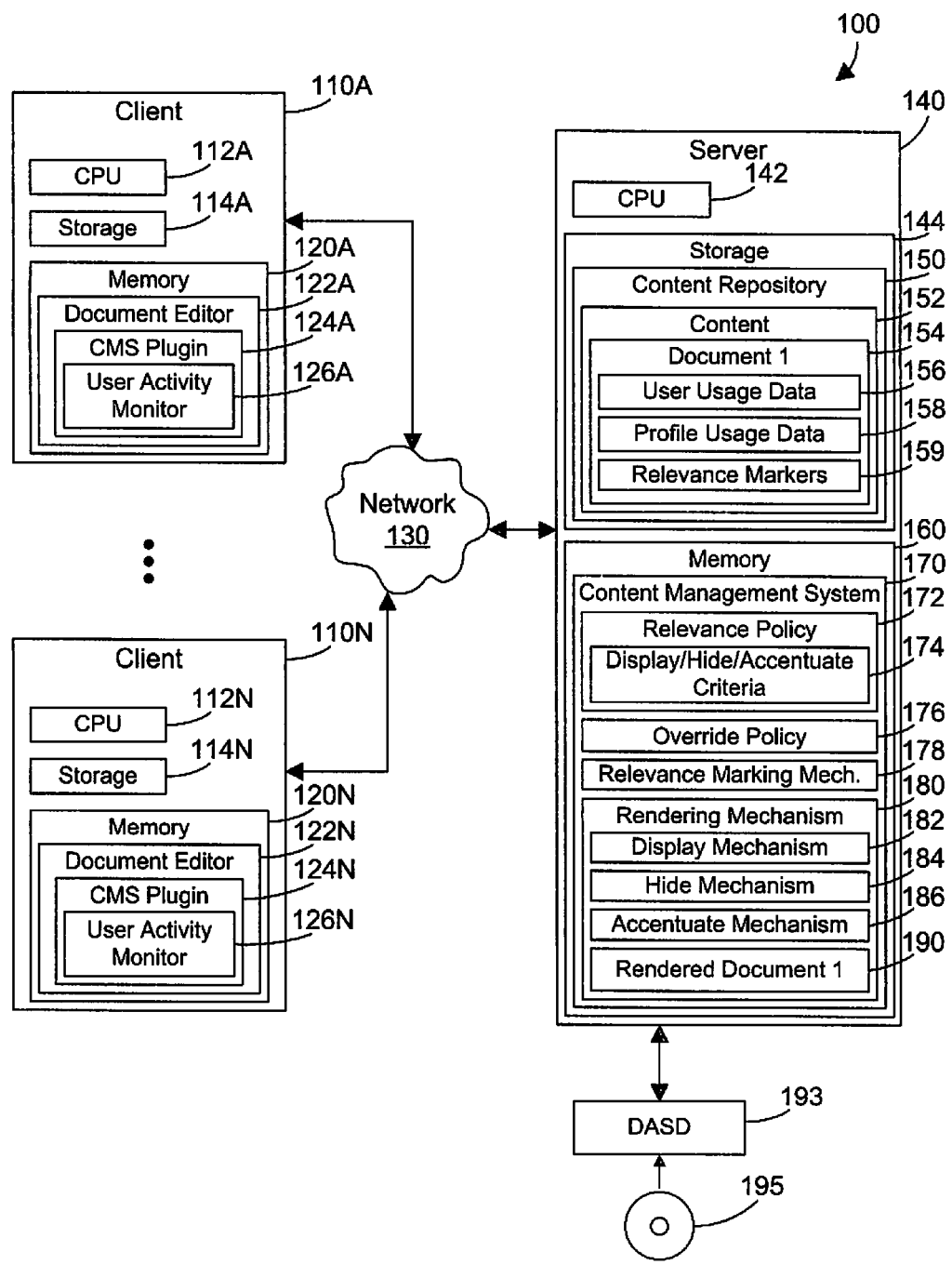
FIG. 1 is a block diagram of a networked computer system that includes a server computer system that has a content management system that includes a rendering mechanism that renders a document to a user in a way that may display, hide and accentuate portions of the document according to the usage data that indicates how the document was accessed in the past.

Referring to FIG. 1, networked computer system 100 includes multiple clients, shown in FIG. 1 as clients 110A, ..., 110N, coupled to a network 130. Each client preferably includes a CPU, storage, and memory that contains a document editor, a content management system (CMS) plugin, and a user activity monitor. Thus, client 110A includes a CPU 112A, storage 114A, memory 120A, a document editor 122A in the memory 120A that is executed by the CPU 112A, a CMS plugin 124A that allows the document editor 122A to interact with content 152 in the repository 150 that is managed by the CMS 170 in server 140, and a user activity mechanism 126A that monitors how a user accesses a document in the repository 150. In similar fashion, other clients have similar components shown in client 110A, through client 110N, which includes a CPU 112N, storage 114N, memory 120N, a document editor 122N, a CMS plugin 124N, and a user activity monitor 126N. A user activity monitor monitors how a user accesses a document, such as document 154, and may create both user usage data 156 and profile usage data 158 in the document 154 that reflects how the user accessed the document.

The CMS 170 resides in the main memory 160 of a server computer system 140 that also includes a CPU 142 and storage 144 that includes a content repository 150 that holds content 152 managed by the CMS 170. Content 152 may include one or more documents 154. As used in the disclosure and claims herein, the term "document" means any type of data that may be managed by a content management system, including all known types of data and objects as well as those developed in the future, and the term "element" means any section or portion of a document that may be individually displayed, hidden, or accentuated. A document 154 may include user usage data 156, profile usage data 158, and relevance markers 159 that will be explained in more detail below. One example of a suitable server computer system 140 is an IBM eServer System computer system. However, those skilled in the art will appreciate that the disclosure herein applies equally to any type of client or server computer systems, regardless of whether each computer system is a complicated multi-user computing apparatus, a single user workstation, or an embedded control system. CMS 170 includes a relevance policy 172 that specifies one or more criteria 174 that determine when to display, hide, and accentuate elements in a document based on the usage data. The relevance policy 172 may be defined for a particular user, or may be defined based on a role of the user. An override policy 176 may be specified that overrides and therefore takes precedence over the criteria 174 in the relevance policy 172.

A relevance marking mechanism 178 processes the usage data (e.g., 156 and 158) in a document, and generates from the usage data and from the relevance policy 172 a plurality of relevance markers 159 in the document that specify whether a section should be displayed, hidden or accentuated. The relevance marking mechanism 178 thus analyzes the usage data and relevance policy to generate relevance markers 159 that allow the rendering mechanism 180 to render different sections of a document differently based on the relevance markers 159.

Figure 3:
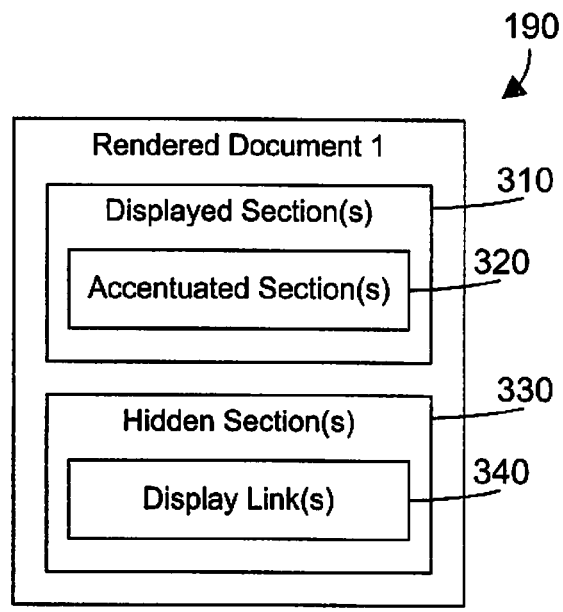
FIG. 3 is a block diagram of a sample rendered document 190 in FIG. 1.

The CMS 170 also includes a rendering mechanism 180 that renders documents to a user based on the information in the document that relates to prior usage of the document, which may include the user usage data 156, profile usage data 158, and relevance markers 159. The rendering mechanism 180 includes a display mechanism 182 that displays elements in the document that need to be displayed, a hide mechanism 184 that hides elements in the document that do not need to be displayed, and an accentuate mechanism 186 that accentuates displayed elements in the document. The result is a rendered document 190 that may include displayed sections 310 shown in FIG. 3 and hidden sections 330 shown in FIG. 3. The displayed sections 310 may include one or more accentuated sections 320 as shown in FIG. 3. An example of an accentuated section is a text section that has been highlighted or bolded. An image section could be accentuated by outlining the image in red, while an audio section could be accentuated by playing an additional tone. The disclosure and claims herein extend to any suitable manner for accentuating a section of a document. The hidden sections 330 may include display links 340 that may be selected by the user to display the hidden sections 330. In this manner, sections of a document may be hidden for the convenience of the user, while still providing a way to display the hidden sections if the user decides the hidden sections need to be displayed.

While the relevance marking mechanism 178 is shown separate from the rendering mechanism 180 in FIG. 1, it is equally within the scope of the disclosure and claims herein to provide the function of relevance marking mechanism 178 within the rendering mechanism 180. In addition, the rendering mechanism 180 could do the analysis of the usage data and relevance policy and render the document without providing the relevance markers 159 in the document 154.

In FIG. 1, repository 150 is shown separate from content management system 170. In the alternative, repository 150 could be within the content management system 170. Regardless of the location of the repository 150, the content management system 170 controls access to content 152 in the repository 150.

Server computer system 140 may include other features of computer systems that are not shown in FIG. 1 but are well-known in the art. For example, server computer system 140 preferably includes a display interface, a network interface, and a mass storage interface to an external direct access storage device (DASD) 193. The display interface is used to directly connect one or more displays to server computer system 140. These displays, which may be non-intelligent (i.e., dumb) terminals or fully programmable workstations, are used to provide system administrators and users the ability to communicate with server computer system 140. Note, however, that while a display interface is provided to support communication with one or more displays, server computer system 140 does not necessarily require a display, because all needed interaction with users and other processes may occur via the network interface.

The network interface is used to connect the server computer system 140 to multiple other computer systems (e.g., 110A, ..., 110N) via a network, such as network 130. The network interface and network 130 broadly represent any suitable way to interconnect electronic devices, regardless of whether the network 130 comprises present-day analog and/or digital techniques or via some networking mechanism of the future. In addition, many different network protocols can be used to implement a network. These protocols are specialized computer programs that allow computers to communicate across a network. TCP/IP (Transmission Control Protocol/Internet Protocol) is an example of a suitable network protocol.

The mass storage interface is used to connect mass storage devices, such as a direct access storage device 193, to server computer system 140. One specific type of direct access storage device 193 is a readable and writable CD-RW drive, which may store data to and read data from a CD-RW 195.

Main memory 160 preferably contains data and an operating system that are not shown in FIG. 1. A suitable operating system is a multitasking operating system known in the industry as i5/OS; however, those skilled in the art will appreciate that the spirit and scope of this disclosure is not limited to any one operating system. In addition, server computer system 140 utilizes well known virtual addressing mechanisms that allow the programs of server computer system 140 to behave as if they only have access to a large, single storage entity instead of access to multiple, smaller storage entities such as main memory 160, storage 144 and DASD device 193. Therefore, while data, the operating system, and content management system 170 may reside in main memory 160, those skilled in the art will recognize that these items are not necessarily all completely contained in main memory 160 at the same time. It should also be noted that the term "memory" is used herein generically to refer to the entire virtual memory of server computer system 140, and may include the virtual memory of other computer systems coupled to computer system 140.

CPU 142 may be constructed from one or more microprocessors and/or integrated circuits. CPU 142 executes program instructions stored in main memory 160. Main memory 160 stores programs and data that CPU 142 may access. When computer system 140 starts up, CPU 142 initially executes the program instructions that make up the operating system.

Although server computer system 140 is shown to contain only a single CPU, those skilled in the art will appreciate that a content management system 170 may be practiced using a computer system that has multiple CPUs. In addition, the interfaces that are included in server computer system 140 (e.g., display interface, network interface, and DASD interface) preferably each include separate, fully programmed microprocessors that are used to off-load compute-intensive processing from CPU 142. However, those skilled in the art will appreciate that these functions may be performed using I/O adapters as well.

At this point, it is important to note that while the description above is in the context of a fully functional computer system, those skilled in the art will appreciate that the content management system 170 may be distributed as an article of manufacture in a variety of forms, and the claims extend to all suitable types of computer-readable media used to actually carry out the distribution, including recordable media such as floppy disks and CD-RW (e.g., 195 of FIG. 1).

The CMS herein may also be delivered as part of a service engagement with a client corporation, nonprofit organization, government entity, internal organizational structure, or the like. This may include configuring a computer system to perform some or all of the methods described herein, and deploying software, hardware, and web services that implement some or all of the methods described herein. This may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

Figure 2:
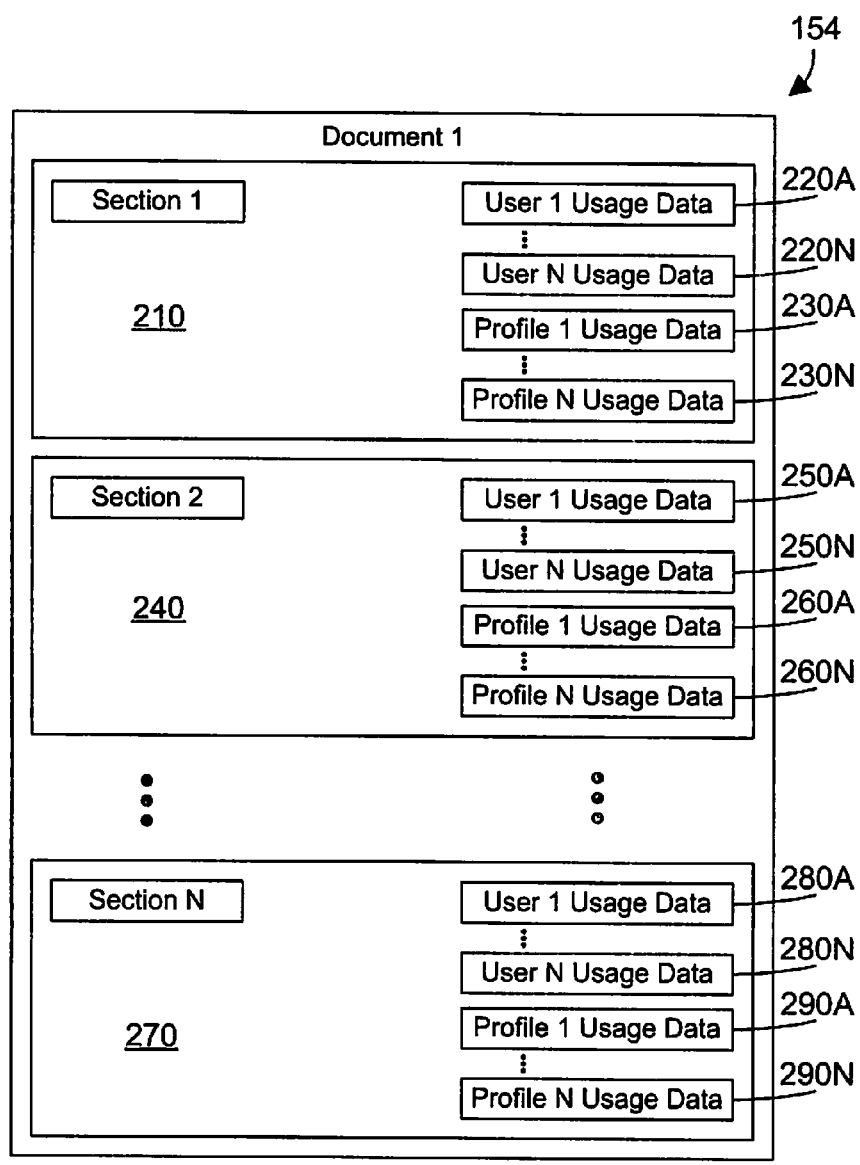
FIG. 2 is a block diagram of a sample document showing usage data bound to corresponding sections of the document.

Referring to FIG. 2, a sample document 154 is shown with different sections, and with usage data corresponding to each section. A first section 210 is shown with usage data corresponding to different users, including user 1 usage data 220A through user N usage data 220N. The first section 210 may also include profile usage data that reflect the user profile of the users that access the document, including profile 1 usage data 230A through profile N usage data 230N. In similar fashion, a second section 240 may include user 1 usage data 250A through user N usage data 250N, and may also include profile 1 usage data 260A through profile N usage data 260N. This continues for all sections of the document, including section N 270, which includes user 1 usage data 280A through user N usage data 280N, and may also include profile 1 usage data 290A through profile N usage data 290N. Note that not all sections of the document need to have corresponding usage data, and not all sections that have corresponding usage data need to have both user usage data and profile usage data. The disclosure and claims herein extend to any document that has any suitable number of sections and any usage data in any of the sections, including either or both user usage data and profile usage data.

User usage data as used herein means usage data that corresponds to how a particular user has accessed the document in the past. Profile usage data as used herein means usage data that corresponds to a role of a particular user that has accessed the document in the past. Thus, if a user we'll call User 1 is a supervisor, and accesses section 1 210 in document 154 in FIG. 2, the user 1 usage data 220A could reflect how the user accessed the section 210, while the profile 1 usage data 230A could reflect how a supervisor accessed the section 210. By including both user usage data and profile usage data in the document that relates to how each section of the document is accessed, the rendering mechanism has great flexibility in determining how to render a document to a user based on either the user's past history in accessing the document, based on the user's role in accessing the document, or both.

Figure 4:
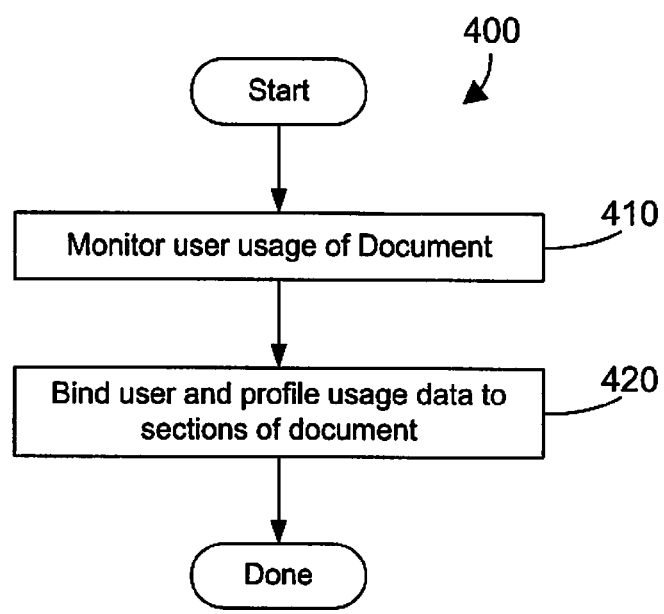
FIG. 4 is a flow diagram of a method for monitoring a user's usage of a document and storing corresponding usage information in the document.

Referring to FIG. 4, a method 400 shows the steps that are preferably performed in generating usage data that may be used by the rendering mechanism 180 in FIG. 1 to determine how to render a document to a user. First, the user's usage of a document is monitored (step 410). Monitoring of the user's usage of a document is preferably performed by a user activity monitor, such as user activity monitor 126A in FIG. 1. The monitored activity may include any suitable indication of how the user accessed each section of the document, including what section is being displayed, how long the section is displayed, whether the section is edited, number of keystrokes, cursor placement, frequency and/or speed of scrolling over a particular element, eye tracking, etc. The usage data is then bound to the specific sections of the document to which the usage data pertains (step 420). As shown in FIG. 1, usage data may include user usage data 156 and profile usage data 158. Binding the usage data to the corresponding sections results in a document as shown in FIG. 2 that includes embedded information that tells the rendering mechanism how the user accessed each section of the document in the past. In the specific implementation shown in FIG. 1, the user activity monitor 126A preferably sends the data it collects to the CMS 170, which then generates corresponding user usage data 156 and profile usage data 158 in each corresponding section of the document 154.

Figure 5:
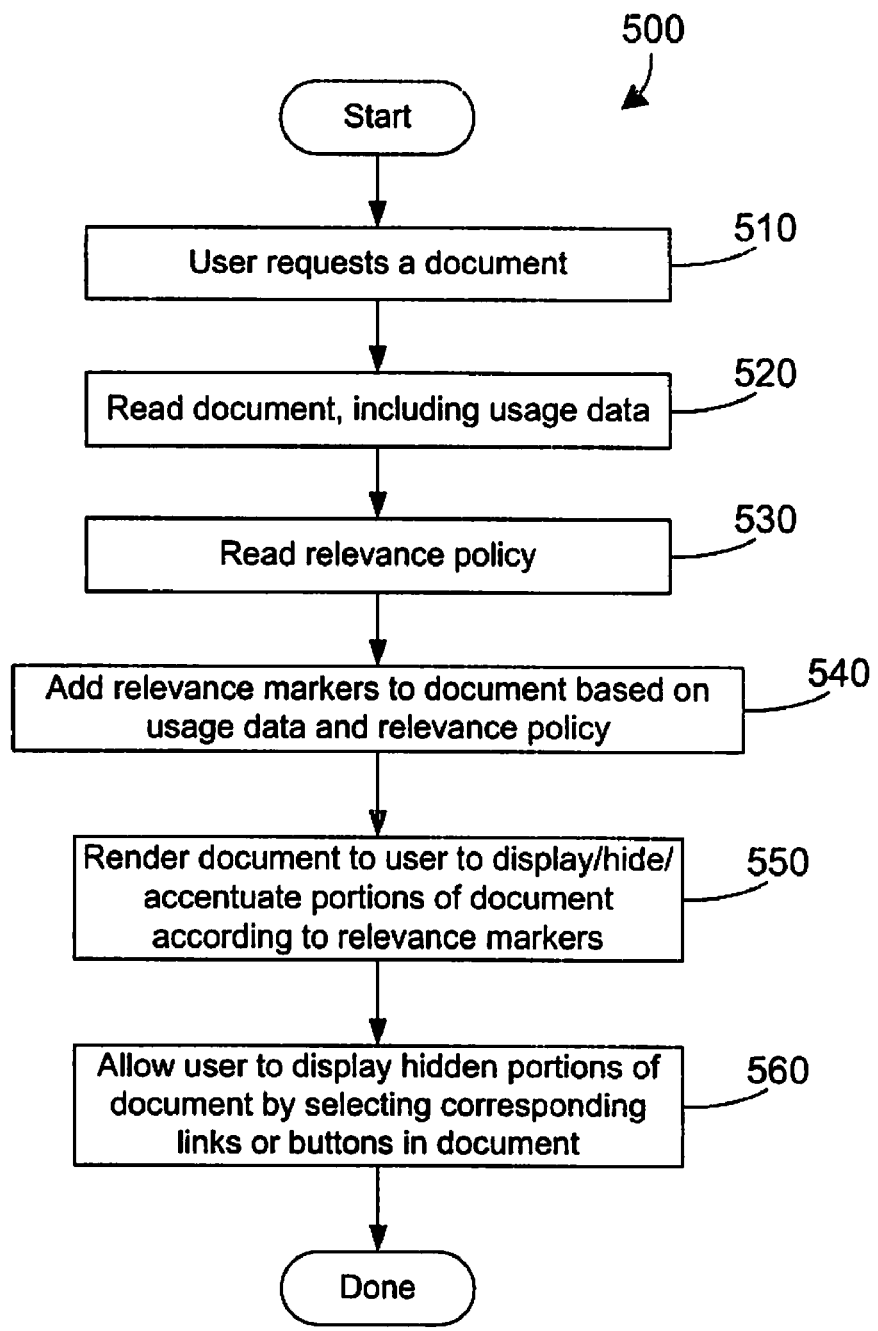
FIG. 5 is a flow diagram of a method for rendering a document to a user based on relevance markers that displays, hides, and accentuates sections of the document based on the relevance markers.

Once usage data is bound to the specific section of the document after executing method 400 in FIG. 4, the usage data may then be used to determine how to render a document. Referring to FIG. 5, a method 500 shows the steps in rendering a document to a user using the usage data in the document. First, a user requests a document (step 510). The document, which includes usage data, is read (step 520). The relevance policy is also read (step 530). User relevance markers are then added to the document based on the usage data and the relevance policy (step 540). The document is then rendered to the user to display, hide and accentuate portions of the document according to the relevance markers (step 550). If a section of the document is hidden, the user is allowed to display the hidden portions by selecting a corresponding link or button in the document (step 560). In this manner, the rendering mechanism may hide portions of the document it deems the user is not likely to want to see based on how the document has been accessed in the past, yet also provides a way for the user to easily view sections that are hidden by clicking on a link or button.

Note that method 500 in FIG. 5 is only one suitable implementation. Other implementations are equally within the scope of the disclosure and claims herein. For example, steps 520-540 in FIG. 5 could be performed to mark a document with user relevance markers, then when a user requests the document in step 510, the document may be rendered in step 550 based on the existing relevance markers without the need of performing steps 520-540 again.

A simple example is now provided to illustrate many of the concepts described above. Referring to FIG. 6, a sample XML document 600 is one suitable example for document 154 in FIGS. 1 and 2. Sample XML document 600 is a sample drug label document, with an object id "obj_id" that uniquely identifies the document 600 in the repository. Document 600 has a name Sneeze Free at 610, a description "This drug cures the common cold." at 620, and with ChemicalDetails at 630 that include EmpericalFormula at 640, ActiveIngredients at 650, and InactiveIngredients at 660. Document 600 also includes a link to a different object at 670 that will be incorporated into document 600 when document 600 is reconstituted. The link at 670 references an object with an obj_id of 2349283, which is shown in FIG. 7 to be an object that includes a copyright notice. While the obj_id is shown for the objects in FIGS. 6 and 7, other metadata could be included that is not shown to simplify this example.

Sample user usage data for a user is shown in a table 800 in FIG. 8. Table 800 includes an Element Path column 810, an Edit Frequency column 820 that shows the last edit time, a View Frequency column 830 that shows the screen time, and a View Frequency column 840 that shows the cursor activity/annotations. In this example, we see that in the past this user has viewed the ActiveIngredients section 80% of the time, and has performed 10 events based on cursor activity/annotations, as shown at entry 850 in table 800. The remaining entries show a much lower screen time view frequency and a much lower number of cursor activity/annotations view frequency. We assume for this example that the user is a scientist that deals with the ActiveIngredients portion of the drug label, resulting in the user usage data as shown in table 800 in FIG. 8. Note that the user usage data shown in table 800 in FIG. 8 is preferably bound to the document 600 in FIG. 6 via a formal relationship in the CMS. In the alternative, the individual entries in table 800 could be embedded into the document 600 using tags that identify the data as user usage data. Note that corresponding profile usage data could also be generated for document 600 in FIG. 6, but is omitted for the sake of clarity in this simple example.

Figure 9:
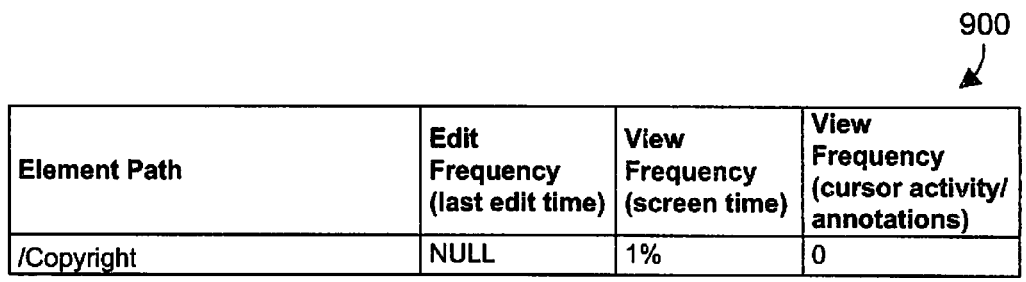
FIG. 9 shows sample user usage data for the object shown in FIG. 7.

Because the object in FIG. 7 is a separate object in the repository, this object will preferably have its own usage data bound to it. Thus, table 900 in FIG. 9 shows a sample of user usage data for the user in accessing this copyright notice object when the user viewed document 600 in FIG. 6.

Figure 10:
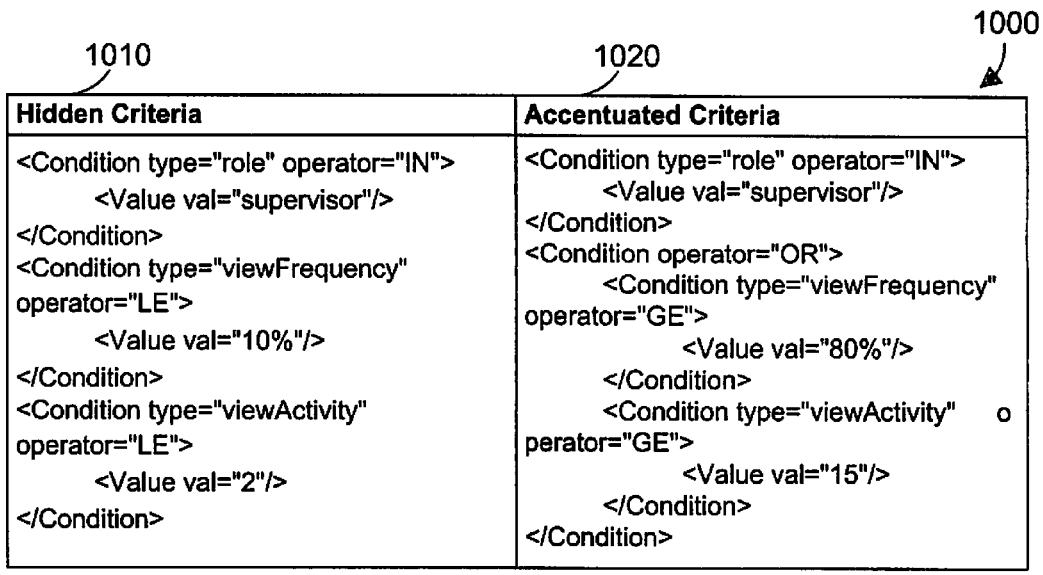
FIG. 10 shows a sample relevance policy for a specific user.

A sample relevance policy is shown as 1000 in FIG. 10, which is one suitable implementation of relevance policy 172 in FIG. 1. Relevance policy 1000 includes a hidden criteria column 1010 that specifies one or more criteria that, when satisfied, result in the corresponding section of the document being hidden. Relevance policy 1000 also includes an accentuated criteria column 1020 that specifies one or more criteria that, when satisfied, result in the corresponding section of the document being accentuated. For all sections of the document that are not hidden or accentuated, the relevance policy 1000 in FIG. 10 assumes these sections will be displayed without being accentuated.

We now assume the document 600 in FIG. 6 is processed by the relevance marking mechanism 172 in FIG. 1 to generate appropriate relevance markers 159 based on the sample user usage data 800 in FIG. 8 and based on the relevance policy 1000 in FIG. 10. The processed document is shown as document 1100 in FIG. 11. Note that document 1100 includes relevance markers, including a relevance marker at 1110 that specifies to hide the Name element, a relevance marker at 1120 that specifies to hide the Description element, a relevance marker at 1130 that specifies to hide the Emperical Formula element, a relevance marker at 1140 that specifies to accentuate the Active Ingredients element, and a relevance marker at 1150 that specifies "neutral", which means in this context to end the accentuation. Note document 1100 in FIG. 11 also includes the data from the copyright notice, which shows the object 1100 has been reconstituted from document 600 in FIG. 6, but the copyright notice at 1160 includes a relevance marker that indicates to hide the copyright notice.

With the relevance markers as shown in document 1100 in FIG. 11, the rendering mechanism 180 in FIG. 1 may now render the document to the user according to the rendering markers. In the rendered document 1200 in FIG. 12, the Name, Description, Emperical Formula, and copyright notice elements are hidden, as shown by the messages at 1210, 1220, 1230 and 1260, respectively. Note that each of the hidden portions 1210, 1220, 1230 and 1260 include an affordance, a plus icon, that allows the hidden data to be viewed by the user. For example, by clicking on the plus icon at 1210, the hidden data relating to the Name element will be displayed to the user. Any suitable indication of additional information and corresponding affordance to cause the additional information to display may be employed. The Active Ingredients element is displayed accentuated, which is bolded for this specific example, as shown at 1240 in FIG. 12. The Inactive Ingredients element is displayed normally, as shown at 1250 in FIG. 12. This simple example shows how a document may be rendered to a user based on the user's past use of the document in a way that enhances the usability of the document by hiding the less relevant portions of the document, displaying more relevant portions, and accentuating the most relevant portions.

FIG. 13 shows a second sample document 1300 for a drug called Cough Free. Note that document 1300 includes a link to the same copyright notice object at 1310. Even if the viewing user has never accessed document 1300 before, the rendering mechanism could decide to hide the copyright notice based on the user's previous access to the copyright notice (e.g., in accessing document 600 in FIG. 6), as shown by the rendered document 1400 in FIG. 14. Because the usage data is bound to the corresponding objects, this usage data may be used for other documents that link to documents with usage data.

There are certain situations when a user's preferences for viewing different sections of a document need to be overridden. For example, let's assume a pharmaceutical company wants to make sure each author always sees the copyright notice in the object in FIG. 7. For this reason, a system administrator may specify one or more override policies 176 that override or preempt the policies specified by the user. Thus, even though the user's usage data in table 800 in FIG. 8 and relevance policy 1000 in FIG. 10 would normally hide the copyright notice, as shown at 1160 in FIGS. 11 and 1260 in FIG. 12, if a system administrator specifies to override the policy for the copyright element, as shown in the override policy 1500 in FIG. 15, the copyright policy will be displayed, as shown in the rendered document 1600 in FIG. 16.

The specific example has been shown herein to use user usage data. The disclosure and claims herein also extend to using profile usage data as well, which is usage data indicative of a role of the user. Thus, one user might have the role of supervisor, so that user's usage data will be stored both as user usage data and also as profile usage data for supervisors. Another user might have the role of scientist for active ingredients, which results in this user's usage data being stored both as user usage data and also as profile usage data for scientists for active ingredients. The profile usage data is especially useful to determine how to display a document to a user when the user has never before used the document, based upon the role of the user.

Note that usage data, whether user usage data 156 or profile usage data 158, may be collected and stored using any suitable heuristic or criteria. One suitable implementation would keep the last use of a user in the user usage data and the profile usage data. Another suitable implementation would average the last five accesses to a document by a user in the user usage data and the profile usage data. Another suitable implementation would keep the last 10 accesses to a document, and throw out the two documents with the least number of accesses. These simple examples are provided to illustrate that the usage data may be collected and stored using any suitable heuristic or criteria.

The content management system disclosed and claimed herein provides more user-friendly rendering of documents by tracking how a user accessed a document in the past, then rendering the document to the user based on the user's specified relevance policy and based on one or more past accesses to the document. The result is that documents are rendered to the user in a way that displays some sections of the document, hides some sections of the document, and accentuates some sections of the document. The result is more efficient use of the content management system by a wide variety of users.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims. For example, while the examples in the figures and discussed above related to XML documents, the disclosure and claims herein expressly extend to content management systems that handle any suitable type of content, whether currently known or developed in the future.

What is claimed is:

1. An apparatus comprising:
    at least one processor;
    a memory coupled to the at least one processor;
    a repository residing in the memory;
    a document residing in the repository, the document comprising a plurality of sections corresponding to a plurality of elements and usage data for at least one of the plurality of elements added to each corresponding section of the document based on previous access to the document, wherein the usage data includes user usage data specific to a user and profile usage data related to a role of the user;
    a content management system residing in the memory and executed by the at least one processor, the content management system comprising:
        a relevance marking mechanism that generates from the usage data at least one relevance marker in the document that is used by the rendering mechanism to determine when to display, hide, and accentuate elements in the document; and
        a rendering mechanism that renders the document to the user in a manner that displays and hides elements of the document based on the at least one relevance marker in the document.

2. The apparatus of claim 1 wherein the rendering mechanism accentuates at least one displayed element based on the usage data.

3. The apparatus of claim 1 wherein the rendering mechanism provides a mechanism for the user to display hidden elements in the document.

4. The apparatus of claim 1 further comprising a relevance policy specified by a user that indicates at least one criterion that determines when sections of the document are displayed, hidden and accentuated.

5. The apparatus of claim 1 further comprising a user activity monitor that monitors activity of the user while accessing the document, and generates from the activity of the user corresponding usage data for the user.

6. The apparatus of claim 1 further comprising an override policy residing in the memory that causes the rendering mechanism to display an element of the document that would normally be hidden according to the usage data.

7. A computer-implemented method for a content management system to render a document to a user, the method comprising the steps of:
    (A) monitoring usage of the document during a first access of the document and generating therefrom usage data for a plurality of sections in the document, wherein the usage data includes user usage data specific to the user and profile usage data related to a role of the user;
    (B) adding the usage data from step (A) for the plurality of sections in the document to each corresponding section in the document;
    (C) generating from the usage data at least one relevance marker in the document that is used to determine when to display, hide, and accentuate elements in the document; and
    (D) when the user requests a second access of the document, rendering the document to the user in a manner that displays and hides elements of the document based on the at least one relevance marker in the document.

8. The method of claim 7 further comprising the step of accentuating at least one displayed element based on the usage data.

9. The method of claim 7 further comprising the step of providing a mechanism for the user to display hidden elements in the document.

10. The method of claim 7 further comprising a relevance policy specified by a user that indicates at least one criterion that determines when sections of the document are displayed, hidden and accentuated.

11. The method of claim 7 further comprising the step of monitoring activity of the user while accessing the document, and generating from the activity of the user corresponding usage data for the user.

12. The method of claim 7 further comprising the step of displaying an element of the document that would normally be hidden according to the usage data due to an override policy mandating display of the element.

13. An article of manufacture comprising:
    (A) a content management system comprising:
        a repository;
        a document residing in the repository, the document comprising a plurality of sections corresponding to a plurality of elements and usage data for at least one of the plurality of elements added to each corresponding section of the document based on previous access to the document, wherein the usage data includes user usage data specific to a user and profile usage data related to a role of the user;

a relevance marking mechanism that generates from the usage data at least one relevance marker in the document that is used to determine when to display, hide, and accentuate elements in the document;

a rendering mechanism that renders the document to the user in a manner that displays and hides elements of the document based on the at least one relevance marker in the document; and (B) computer-readable media bearing the content management system.

14. The article of manufacture of claim 13 wherein the rendering mechanism accentuates at least one displayed element based on the usage data.

15. The article of manufacture of claim 13 wherein the rendering mechanism provides a mechanism for the user to display hidden elements in the document.

16. The article of manufacture of claim 13 wherein the content management system further comprises a relevance policy specified by a user that indicates at least one criterion that determines when sections of the document are displayed, hidden and accentuated.

17. The article of manufacture of claim 13 further comprising a user activity monitor that monitors activity of the user while accessing the document, and generates from the activity of the user corresponding usage data for the user.

18. The article of manufacture of claim 13 further comprising an override policy that causes the rendering mechanism to display an element of the document that would normally be hidden according to the usage data.

19. A computer-implemented method for a content management system to render a document to a user, the method comprising the steps of:

(A) monitoring usage of the document by a user during a first access of the document and generating therefrom usage data for a plurality of sections in the document;

(B) adding the usage data from step (A) for the plurality of sections in the document to each corresponding section in the document;

(C) reading a user-defined relevance policy that specifies a plurality of criteria that determine when to display, hide and accentuate the plurality of elements in the document;

(D) generating from the usage data and the relevance policy a plurality of relevance markers in the document for a plurality of elements in the document, the plurality of relevance markers indicating when to display, hide and accentuate the plurality of elements in the document;

(E) when the user requests a second access of the document, rendering the document to the user in a manner that displays, hides and accentuates elements of the document based on the plurality of relevance markers, the rendered document including a button corresponding to each hidden element in the document for displaying the corresponding hidden element; and (F) displaying an element of the document that would normally be hidden according to the usage data due to an override policy mandating display of the element.

* * * * *